(12) United States Patent
Ogino (10) Patent No.: US 9,079,134 B2
(45) Date of Patent: Jul. 14, 2015

(54) CARBON DIOXIDE SEPARATING AND CAPTURING APPARATUS

(75) Inventor: Tomoyuki Ogino, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 14/123,856

(22) PCT Filed: Jun. 5, 2012

(86) PCT No.: PCT/JP2012/003672
§ 371 (c)(1),
(2), (4) Date: Dec. 4, 2013

(87) PCT Pub. No.: WO2012/169172
PCT Pub. Date: Dec. 13, 2012

(65) Prior Publication Data
US 2014/0096684 A1    Apr. 10, 2014

(30) Foreign Application Priority Data

Jun. 6, 2011    (JP) ................................. 2011-126146

(51) Int. Cl.
| | | |
|---|---|---|
| *B01D 53/02* | (2006.01) | |
| *B01D 53/14* | (2006.01) | |
| *C01B 31/20* | (2006.01) | |
| *B01D 53/62* | (2006.01) | |

(52) U.S. Cl.
CPC .......... *B01D 53/1425* (2013.01); *B01D 53/025* (2013.01); *B01D 53/62* (2013.01); *C01B 31/20* (2013.01); *B01D 2252/204* (2013.01); *B01D 2252/2041* (2013.01);
(Continued)

(58) Field of Classification Search
CPC ................. B01D 2252/204; B01D 2252/2041; B01D 2252/20415; B01D 2252/20452; B01D 2252/20484; B01D 2252/20489; B01D 2253/102; B01D 2253/25; B01D 2253/306; B01D 2253/308; B01D 2253/311; B01D 2257/504; B01D 2259/4009; B01D 53/025; B01D 53/1425; B01D 53/62; C01B 31/20; Y02C 10/04; Y02C 10/06; Y02C 10/08
See application file for complete search history.

(56) References Cited

U.S. PATENT DOCUMENTS 3,619,130 A * 11/1971 Ventriglio et al. .............. 95/115
4,093,429 A *  6/1978 Siegler et al. .................. 95/105
(Continued)

FOREIGN PATENT DOCUMENTS

| JP | 61-227821 A | 10/1986 |
|---|---|---|
| JP | A-64-56114 | 3/1989 |

(Continued)

OTHER PUBLICATIONS

International Search Report issued in International Patent Application No. PCT/JP2012/003672 dated Sep. 18, 2012.
(Continued)

*Primary Examiner* — Christopher P Jones
(74) *Attorney, Agent, or Firm* — Oliff PLC (57) ABSTRACT

A carbon dioxide separating and capturing apparatus includes: a casing including inner space through which a to-be-treated gas containing carbon dioxide flows; a carbon dioxide adsorbing material disposed in the inner space, the carbon dioxide adsorbing material adsorbing and separating carbon dioxide from the to-be-treated gas flowing through the inner space; and a steam generator configured to generate steam in the inner space and release the steam in the inner space, the steam desorbing and capturing the carbon dioxide adsorbed to the carbon dioxide adsorbing material.

9 Claims, 7 Drawing Sheets

(52) U.S. Cl.
CPC ............... *B01D 2252/20415* (2013.01); *B01D 2252/20452* (2013.01); *B01D 2252/20484* (2013.01); *B01D 2252/20489* (2013.01); *B01D 2253/102* (2013.01); *B01D 2253/25* (2013.01); *B01D 2253/306* (2013.01); *B01D 2253/308* (2013.01); *B01D 2253/311* (2013.01); *B01D 2257/504* (2013.01); *B01D 2259/4009* (2013.01); *Y02C 10/04* (2013.01); *Y02C 10/06* (2013.01); *Y02C 10/08* (2013.01)

(56) References Cited

U.S. PATENT DOCUMENTS 5,061,455 A * 10/1991 Brose et al. ..................... 96/122
6,755,892 B2 * 6/2004 Nalette et al. ..................... 95/11
2011/0041688 A1 * 2/2011 Eisenberger .................... 95/107
2012/0167764 A1 * 7/2012 Eisenberger .................... 95/139
2014/0105809 A1 * 4/2014 Okumura et al. .......... 423/437.1

FOREIGN PATENT DOCUMENTS

| JP | A-2007-61777 | 3/2007 |
| WO | WO 2011/013332 A1 | 2/2011 |

OTHER PUBLICATIONS

Dec. 31, 2014 Office Action issued in Chinese Application No. 201280022341.8.

* cited by examiner

1A: ADSORPTION, 1B: REPAIR (IMMERSING)

Fig. 5

1A: ADSORPTION, 1B: REPAIR (ADSORBING SOLUTION COLLECTION)

CARBON DIOXIDE SEPARATING AND CAPTURING APPARATUS

TECHNICAL FIELD

The present invention relates to a carbon dioxide separating and capturing apparatus configured to separate carbon dioxide from a to-be-treated gas containing carbon dioxide and capture the carbon dioxide separated from the to-be-treated gas.

BACKGROUND ART

In recent years, CCS (Carbon dioxide Capture and Storage) has been drawing attention as a technology for reducing carbon dioxide emission. CCS is a technology for selectively separating carbon dioxide from a to-be-treated gas containing carbon dioxide, capturing the separated carbon dioxide, and storing the captured carbon dioxide in the ground or water. CCS is expected to be adopted by large-scale carbon dioxide emission sources such as thermal power plants and oilfields. CCS is also applicable to carbon dioxide concentration adjustment in enclosed residential space (see Patent Literatures 1 and 2, for example).

Patent Literature 2 discloses a carbon dioxide separating and capturing apparatus adopting a solid-adsorbent method for separating and capturing carbon dioxide. The carbon dioxide separating and capturing apparatus includes an adsorbing material-packed tank packed with a solid carbon dioxide adsorbing material. The adsorbing material-packed tank is connected to piping for taking in a to-be-treated gas and piping for taking in a heating gas. The upstream end of such heating gas supply piping is connected to a steam generator. Steam generated by the steam generator is utilized as the heating gas.

According to the carbon dioxide separating and capturing apparatus, when the to-be-treated gas is supplied to the adsorbing material-packed tank, the carbon dioxide adsorbing material adsorbs and removes carbon dioxide from the to-be-treated gas, and thereby a clean gas with a lowered carbon dioxide concentration can be produced. When the steam is supplied to the adsorbing material-packed tank instead of the to-be-treated gas, the carbon dioxide adsorbing material is heated. As a result, carbon dioxide is desorbed from the carbon dioxide adsorbing material and the desorbed carbon dioxide can be captured, and also, the carbon dioxide adsorbing material can be regenerated.

CITATION LIST

Patent Literature

PTL 1: Japanese Laid-Open Patent Application Publication No. 2007-61777
PTL 2: (PCT) International Publication No. WO 2011/013332

SUMMARY OF INVENTION

Technical Problem

According to the above-described carbon dioxide separating and capturing apparatus, the steam generator, which is provided outside the adsorbing material-packed tank, sends the steam into the adsorbing material-packed tank via the heating gas supply piping. Generally speaking, such piping is exposed to external air, and the temperature of the steam is higher than that of the external air. For this reason, there is a possibility that the steam becomes cooled down as a result of exchanging heat with the piping, and it is possible that, under some condition, the steam may even become condensed inside the piping. In such a case, it is necessary to increase the temperature of the steam at an outlet of the steam generator, and also, a necessary amount of steam for desorbing and capturing carbon dioxide (for carbon dioxide adsorbing material regeneration) becomes large.

Inside the adsorbing material-packed tank, the flow of the steam is relatively active in portions of the tank that are close to an outlet of the heating gas supply piping, but relatively inactive in portions of the tank that are remote from the outlet. Accordingly, carbon dioxide desorption from some portions of the carbon dioxide adsorbing material is completed speedily, whereas carbon dioxide desorption from some other portions of the carbon dioxide adsorbing material is not completed speedily. In order to regenerate the entire carbon dioxide adsorbing material, it is necessary to continue supplying the steam to the adsorbing material-packed tank until the carbon dioxide desorption is completed at the portions where the carbon dioxide desorption does not progress speedily. Thus, a necessary amount of steam for regenerating the entire carbon dioxide adsorbing material becomes large if uneven regeneration of the carbon dioxide adsorbing material occurs due to unevenness in the flow of the steam.

In view of the above, an object of the present invention is to reduce a necessary amount of steam for desorbing and capturing carbon dioxide (for carbon dioxide adsorbing material regeneration) and reduce heat loss from the steam, thereby improving the efficiency of a carbon dioxide separating and capturing apparatus.

Solution to Problem

A carbon dioxide separating and capturing apparatus according to the present invention is configured to separate carbon dioxide from a to-be-treated gas containing carbon dioxide and capture the carbon dioxide separated from the to-be-treated gas. The carbon dioxide separating and capturing apparatus includes: a casing including inner space through which the to-be-treated gas flows; a carbon dioxide adsorbing material disposed in the inner space, the carbon dioxide adsorbing material adsorbing and separating carbon dioxide from the to-be-treated gas flowing through the inner space; and a steam generator configured to generate steam in the inner space and release the steam in the inner space, the steam desorbing and capturing the carbon dioxide adsorbed to the carbon dioxide adsorbing material.

According to the above configuration, the steam for desorbing and capturing carbon dioxide (for carbon dioxide adsorbing material regeneration) is generated in the inner space of the casing, and released in the inner space. For this reason, piping for supplying the steam can be eliminated. As a result, heat loss from the steam and unevenness in the flow of the steam, both of which occur when the steam is supplied through piping, can be prevented. This makes it possible to reduce heat loss from the steam and reduce a necessary amount of steam for desorbing and capturing carbon dioxide (for carbon dioxide adsorbing material regeneration). Consequently, the efficiency of the carbon dioxide separating and capturing apparatus can be improved.

The steam generator may include a reservoir set within the casing and configured to store water. The steam generator may be configured to evaporate the water stored in the reservoir to generate steam. According to this configuration, the reservoir for storing water from which the steam is generated can be readily set in the inner space of the casing. Moreover, the steam generated from the water in the reservoir can be fed to the carbon dioxide adsorbing material by utilizing natural convection. This makes it possible to favorably improve the efficiency of the carbon dioxide separating and capturing apparatus.

The steam generator may include: a heater configured to heat the water stored in the reservoir; and an agitator configured to agitate the water stored in the reservoir. According to this configuration, the temperature of the water in the reservoir can be readily managed, and the steam can be suitably generated.

The steam generator may include a decompressor configured to decompress the inner space. According to this configuration, low-temperature steam can be generated, which makes it possible to favorably suppress thermal degradation of the carbon dioxide adsorbing material.

The carbon dioxide separating and capturing apparatus may further include a carbon dioxide capture line through which carbon dioxide and steam from the inner space flow. The decompressor may be a vacuum pump provided on the carbon dioxide capture line. When the vacuum pump operates, the water stored in the reservoir evaporates, and steam generated from the stored water may be drawn into the carbon dioxide capture line together with carbon dioxide desorbed from the carbon dioxide adsorbing material. According to this configuration, by switching between an operating state and a stopped state of the vacuum pump, whether or not to generate steam and whether or not to desorb and capture carbon dioxide (for carbon dioxide adsorbing material regeneration), that is, whether or not to discharge the carbon dioxide from the casing, can be switched at one time. This makes it possible to simplify the overall configuration of the carbon dioxide separating and capturing apparatus.

The casing may include a carbon dioxide outlet connected to the carbon dioxide capture line. The carbon dioxide adsorbing material may be disposed between the reservoir and the carbon dioxide outlet. According to this configuration, the steam generated from the water in the reservoir is drawn into the carbon dioxide capture line after being fed to the carbon dioxide adsorbing material. This makes it possible to favorably improve the efficiency of the carbon dioxide separating and capturing apparatus.

The reservoir may be set at a center of the inner bottom. According to this configuration, unevenness in the flow of the steam can be favorably suppressed in the inner space of the casing. This makes it possible to favorably improve the efficiency of the carbon dioxide separating and capturing apparatus.

The casing may include: an inner shell defining the inner space; an outer shell covering an outside of the inner shell; a fluid passage surrounded by the inner shell and the outer shell; a fluid inlet through which a high-temperature fluid flows into the fluid passage, the high-temperature fluid having a higher temperature than that of external air of the casing; and a fluid outlet through which the high-temperature fluid flows out of the fluid passage. This configuration makes it possible to suppress heat loss from the steam, the heat loss occurring when the heat of the steam is taken away by the casing. This makes it possible to favorably improve the efficiency of the carbon dioxide separating and capturing apparatus.

The high-temperature fluid may be the to-be-treated gas. This configuration eliminates the necessity of including a separate heat source. This makes it possible to favorably suppress an increase in the size of the overall structure of the carbon dioxide separating and capturing apparatus.

The carbon dioxide separating and capturing apparatus may include a plurality of the casings which are at least two casings including a first casing and a second casing. When the steam generator in the first casing is operated to desorb and capture carbon dioxide, the to-be-treated gas may be supplied to the inner space of the second casing after being passed through the fluid passage of the first casing, and carbon dioxide may be separated, by adsorption, from the to-be-treated gas in the second casing.

Advantageous Effects of Invention

The present invention makes it possible to reduce a necessary amount of steam for desorbing and capturing carbon dioxide (for carbon dioxide adsorbing material regeneration) and reduce heat loss from the steam, thereby improving the efficiency of a carbon dioxide separating and capturing apparatus.

DESCRIPTION OF EMBODIMENTS

Hereinafter, embodiments of the present invention will be described with reference to the accompanying drawings. In the drawings, the same or corresponding elements are denoted by the same reference signs, and repeating the same detailed descriptions is avoided.

(To-Be-Treated Gas, Carbon Dioxide Adsorbing Material)

Figure 1:
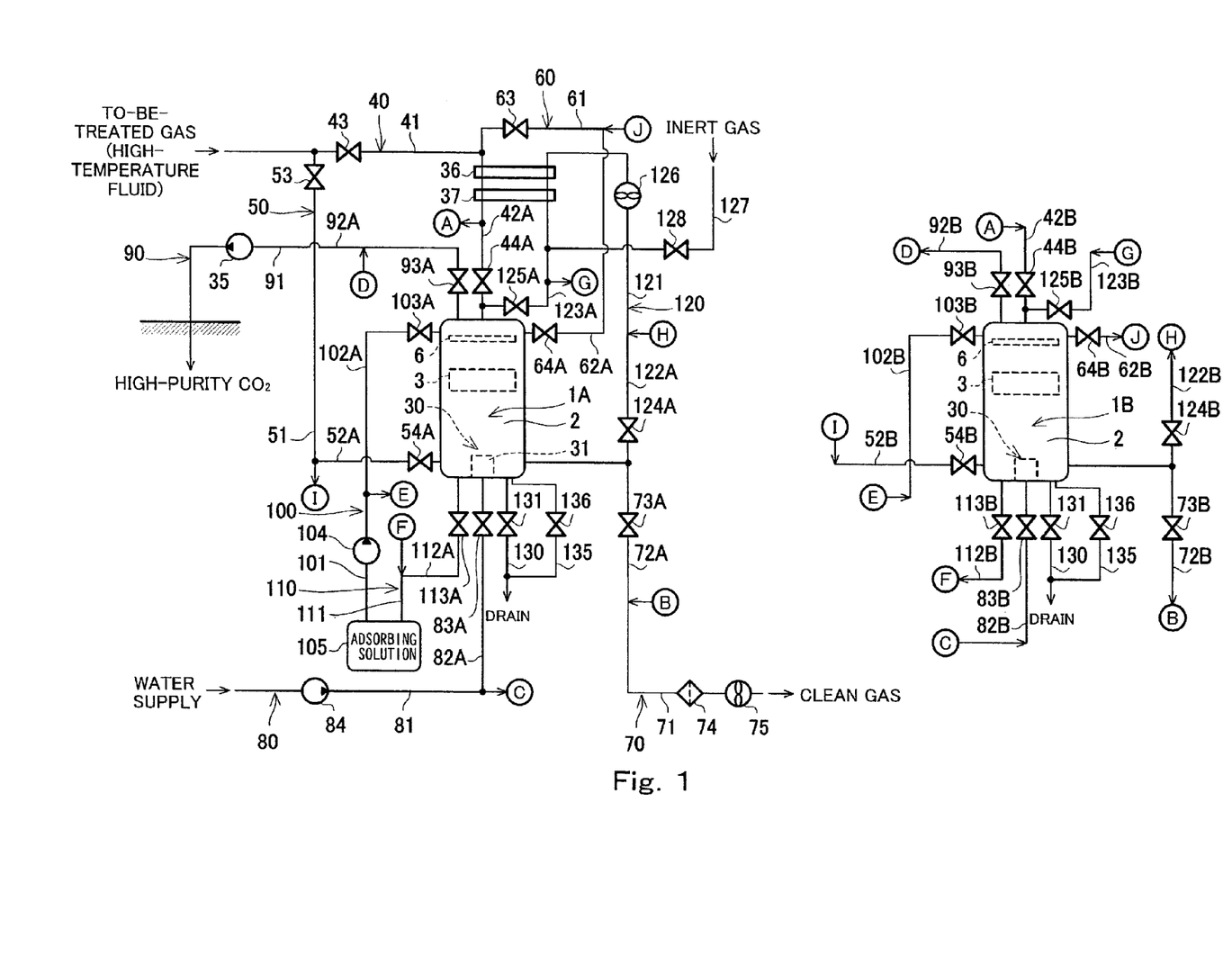
FIG. 1 is a conceptual diagram showing an overall configuration of a carbon dioxide separating and capturing apparatus according to one embodiment of the present invention.

FIG. 1 is a conceptual diagram showing an overall configuration of a carbon dioxide separating and capturing apparatus according to one embodiment of the present invention. It should be noted that, in FIG. 1, circled letters shown at the end of respective lines indicate that if circled letters on multiple lines are the same, these lines are connected to each other. The carbon dioxide separating and capturing apparatus is an apparatus for selectively separating and capturing carbon dioxide from a to-be-treated gas containing carbon dioxide. Examples of the to-be-treated gas include: a flue gas discharged from, for example, a boiler of a thermal power plant; room air in an enclosed residential space; and room air in an air-conditioned room such as an office. In the carbon dioxide separating and capturing apparatus, a solid carbon dioxide adsorbing material, which is a porous material loaded with an adsorbent capable of adsorbing carbon dioxide, is used for separating and capturing carbon dioxide.

Preferably, a weak alkaline amine compound is applied as the adsorbent. Examples of the amine compound include polyethyleneimine, monoethanolamine, diethanolamine, triethanolamine, tetraethylenepentamine, methyldiethanolamine, isopropanolamine, diisopropanolamine, dibutylamine, diethylenetriamine, triethylenetetramine, hexaethylenediamine, benzylamine, and morpholine. Among these, monoethanolamine, diethanolamine, and a mixture of monoethanolamine and diethanolamine are suitable for the reasons that carbon dioxide adsorbed thereto can be desorbed at relatively low temperatures, and that these amine compounds can be readily collected even when they are vaporized.

For example, activated carbon or activated alumina is applicable as the porous material. These porous materials have a large number of pores on their surface, and are capable of supporting an adsorbent in a large amount, thereby making it possible to improve the adsorption capacity of the carbon dioxide adsorbing material. In particular, activated carbon is suitable for reducing the weight of the carbon dioxide adsorbing material since the bulk density of activated carbon is small. In the case where an amine compound is applied as the adsorbent, activated carbon is suitable as the porous material since activated carbon is capable of deodorizing the slight ammonia odor of the amine compound. In the case where activated carbon is applied as the porous material, the activated carbon preferably has an average pore diameter of 20 to 100 Å, a pore volume of 1.0 to 2.0 cc/g, and a specific surface area of 1000 to 2000 m2/g.

In the case of producing the carbon dioxide adsorbing material by loading a porous material with an adsorbent, an adsorbing solution that is either an adsorbent solution or a liquid-phase adsorbent is prepared. The adsorbing solution is sprayed onto the porous material and/or the porous material is immersed into the adsorbing solution. Then, the adsorbing solution is collected to dry the porous material. In the case of loading activated carbon with diethanolamine, an aqueous solution of diethanolamine whose concentration is adjusted in the range of 10 to 55% is applicable as the adsorbing solution. In this case, a carbon dioxide adsorbing material, in which the weight ratio of diethanolamine to the activated carbon is 20 to 200%, can be produced.

Hereinafter, treatment towers 1A and 1B in the carbon dioxide separating and capturing apparatus, lines connected to the treatment towers 1A and 1B, and treatments performed in the treatment towers 1A and 1B are described in sequence. The description is given below on the assumption that the to-be-treated gas is a flue gas, the adsorbent is diethanolamine, the adsorbing solution is an aqueous solution of diethanolamine, and the porous material is activated carbon, unless otherwise specified. However, these may be suitably replaced by the above-mentioned alternatives.

(Treatment Tower)

As shown in FIG. 1, the carbon dioxide separating and capturing apparatus includes a first treatment tower 1A and a second treatment tower 1B. The second treatment tower 1B is the same as the first treatment tower 1A. Therefore, the description of the second treatment tower 1B is omitted while the first treatment tower 1A is described with reference to FIG. 2. It should be noted that, in the present embodiment, the carbon dioxide separating and capturing apparatus includes the two treatment towers for the sake of convenience of the description. Alternatively, the carbon dioxide separating and capturing apparatus may include one treatment tower, or three or more treatment towers.

Figure 2:
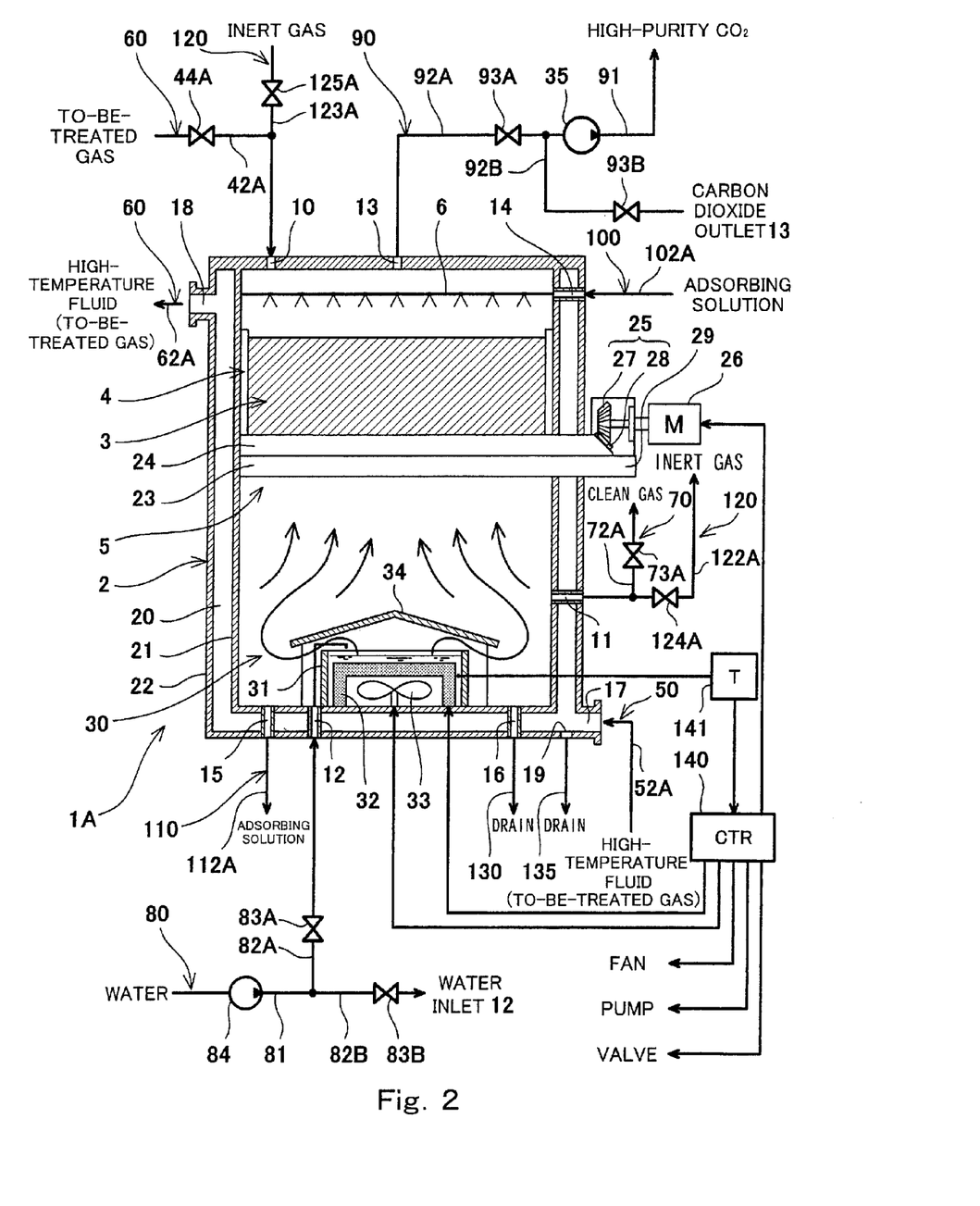
FIG. 2 is a conceptual diagram showing a configuration of a first treatment tower shown in FIG. 1.

FIG. 2 is a conceptual diagram showing a configuration of the first treatment tower 1A of FIG. 1. The first treatment tower 1A includes a casing 2 and a carbon dioxide adsorbing material 3. The overall shape of the casing 2 is cylindrical. The carbon dioxide adsorbing material 3 is produced in a manner described above, and is disposed in the inner space of the casing 2. In the first treatment tower 1A, an adsorption treatment, a capture and regeneration treatment, and a repair treatment are performed. In the adsorption treatment, the to-be-treated gas is flowed through the inner space of the casing 2, so that carbon dioxide is adsorbed to the carbon dioxide adsorbing material 3, and thereby the carbon dioxide is separated from the to-be-treated gas. A resultant clean gas from which the carbon dioxide has been removed is discharged from the inner space of the casing 2. In the capture and regeneration treatment, steam is flowed through the inner space of the casing 2, so that the carbon dioxide adsorbing material 3 is heated, and thereby the carbon dioxide adsorbed to the carbon dioxide adsorbing material 3 is desorbed from the carbon dioxide adsorbing material 3. In this manner, the carbon dioxide is captured and the carbon dioxide adsorbing material 3 is regenerated. In the repair treatment, the carbon dioxide adsorbing material 3 whose adsorption capacity has decreased is immersed in the adsorbing solution (immersing step); the adsorbing solution is collected (adsorbing solution collecting step); an inert gas is flowed through the inner space of the casing 2 to dry the carbon dioxide adsorbing material 3 (drying step); and thereby the carbon dioxide adsorbing material 3 is re-loaded with the adsorbent, so that the adsorption capacity of the carbon dioxide adsorbing material 3 is recovered. It should be noted that, for example, nitrogen gas is applicable as the inert gas.

The casing 2 includes: a gas inlet 10 through which the to-be-treated gas and the inert gas are selectively taken in; a gas outlet 11 through which the clean gas and the inert gas are selectively discharged; a water inlet 12 through which water to generate steam is taken in; a carbon dioxide outlet 13 through which carbon dioxide is discharged; an adsorbing solution inlet 14 through which the adsorbing solution is taken in; an adsorbing solution outlet 15 through which the adsorbing solution is discharged; and an inner drain port 16 through which a drain fluid accumulated in the inner space is discharged. The gas inlet 10 and the carbon dioxide outlet 13 are provided at the top wall of the casing 2, and are in communication with the inner space. The water inlet 12, the adsorbing solution outlet 15, and the inner drain port 16 are provided at the bottom wall of the casing 2, and are in communication with the inner space. The gas outlet 11 and the adsorbing solution inlet 14 are provided at the side wall of the casing 2, and are in communication with the inner space. In this example, the gas inlet 10 is shared by the to-be-treated gas and the inert gas. However, as an alternative, a dedicated gas inlet for the to-be-treated gas and a dedicated gas inlet for the inert gas may be separately provided. The same is true for the gas outlet 11.

The casing 2 has a double-wall structure. That is, the casing 2 includes: a cylindrical inner shell 21 defining the inner space; a cylindrical outer shell 22 surrounding the inner shell 21; a fluid passage 20 formed between the outer peripheral surface of the inner shell 21 and the inner peripheral surface of the outer shell 22, the fluid passage 20 having an annular cross section; a fluid inlet 17 through which a high-temperature fluid flows into the fluid passage 20; a fluid outlet 18 through which the high-temperature fluid flows out of the fluid passage 20; and an outer drain port 19 through which a drain fluid accumulated in the fluid passage 20 is discharged.

The high-temperature fluid is a gas or liquid having a higher temperature than that of the external air of the casing 2, and preferably, having a higher temperature than that of steam used in the capture and regeneration treatment. When the high-temperature fluid is supplied to the fluid passage 20, the temperature of the casing 2 becomes higher than the temperature of the external air, and preferably becomes higher than the temperature of the steam. In the capture and regeneration treatment, by increasing the temperature of the casing 2, heat loss from the steam can be reduced and the efficiency of the carbon dioxide separating and capturing apparatus can be improved. The fluid inlet 17 is provided at the lower end of the side wall of the outer shell 22. The fluid outlet 18 is provided at the upper end of the side wall of the outer shell 22. The fluid inlet 17 and the fluid outlet 18 are arranged at opposite sides, respectively, so as to be away from each other in the circumferential direction. The fluid inlet 17 and the fluid outlet 18 are arranged to be away from each other vertically as well as circumferentially. Therefore, when the high-temperature fluid is supplied to the fluid passage 20, the temperature of the entire casing 2 can be increased. It should be noted that the outer drain port 19 is provided at the bottom wall of the casing 2, and is in communication with the fluid passage 20.

In the present embodiment, the temperature of the flue gas, which is the to-be-treated gas, becomes a relatively high temperature (e.g., approximately 80 degrees Celsius). Therefore, the to-be-treated gas is applied as the high-temperature fluid. In this case, it is unnecessary to include a heat source or heating device dedicated for generating the high-temperature fluid. This makes it possible to suppress an increase in the size of the overall structure of the carbon dioxide separating and capturing apparatus.

Each of the treatment towers 1A and 1B includes: a housing case 4; a passage opening/closing mechanism 5; and a shower 6. The housing case 4 is formed to have a cylindrical shape with a top opening. The housing case 4 is set in the inner space of the casing 2, such that the housing case 4 is in close contact with a vertically middle portion of the inner peripheral surface of the casing 2 (inner shell 21). The carbon dioxide adsorbing material 3 is accommodated within the housing case 4. The passage opening/closing mechanism 5 includes a fixed plate 23, a movable plate 24, a power transmitter 25, and an electric motor 26. The fixed plate 23 and the movable plate 24 both have a discoid shape and substantially the same radius. A large number of through-holes are formed through the fixed plate 23 and the movable plate 24 in a dispersed manner. The fixed plate 23 is fixed to the inner peripheral surface of the side wall of the housing case 4. The movable plate 24 is rotatably placed on the upper surface of the fixed plate 23. The fixed plate 23 and the movable plate 24 form the bottom wall of the housing case 4. The power transmitter 25 includes: a driven bevel gear 27, which is an arc gear, provided at the outer peripheral surface of the movable plate 24; and a driving bevel gear 28 meshed with the driven bevel gear 27. The electric motor 26 is attached to a stay 29 provided on the fixed plate 23. The rotating shaft of the electric motor 26 is connected to the driving bevel gear 28. The shower 6 is disposed above the carbon dioxide adsorbing material 3 in the housing case 4. The shower 6 jets out downward the adsorbing solution that is taken in through the adsorbing solution inlet 14.

By operating the electric motor 26, the movable plate 24 can be rotated and thereby its position can be changed between a closing position and an opening position. When the movable plate 24 is in the closing position, the through-holes of the movable plate 24 do not coincide with the through-holes of the fixed plate 23. Accordingly, the adsorbing solution jetted out of the shower 6 can be stored in the housing case 4. That is, when the immersing step of the repair treatment is performed, the movable plate 24 is in the closing position. On the other hand, when the movable plate 24 is in the opening position, the through-holes of the movable plate 24 coincide with the through-holes of the fixed plate 23. Accordingly, the to-be-treated gas, clean gas, steam, adsorbing solution, and the inert gas can pass through the bottom wall of the housing case 4. That is, the movable plate 24 is in the opening position when the adsorption treatment, the capture and regeneration treatment, the adsorbing solution collecting step of the repair treatment, and the drying step of the repair treatment are performed.

Each of the treatment towers 1A and 1B includes a reservoir 31, a heater 32, and an agitator 33. The reservoir 31 is a container with a top opening. The reservoir 31 is set at the center of the inner bottom surface of the casing 2 (inner shell 21). The reservoir 31 is configured to store liquid-phase water taken in through the water inlet 12. The heater 32 is disposed in the reservoir 31 and configured to heat the water stored in the reservoir 31. The agitator 33 is disposed on the inner bottom of the reservoir 31 and configured to agitate the water stored in the reservoir 31. By operating the heater 32 and the agitator 33, the temperature of the water stored in the reservoir 31 can be increased uniformly. In the present embodiment, when the water stored in the reservoir 31 is heated and evaporated, steam for use in the capture and regeneration treatment is released in the inner space of the casing 2. Thus, the reservoir 31, the heater 32, and the agitator 33 form a steam generator 30, which serves to generate and release steam in the inner space of the casing 2. The reservoir 31 is covered by a roof 34 from above. This makes it possible to both suitably release the steam generated at the reservoir 31 to the inner space of the casing 2 and prevent the adsorbing solution from entering the inside of the reservoir 31. By preventing the adsorbing solution from entering the inside of the reservoir 31, the adsorbing solution is easily stored at the inner bottom of the casing 2. This makes it possible to increase the amount of adsorbing solution to be collected.

(Lines)

Returning to FIG. 1, the carbon dioxide separating and capturing apparatus includes a to-be-treated gas supply line 40, a high-temperature fluid supply line 50, a high-temperature fluid discharge line 60, a clean gas discharge line 70, a water supply line 80, a carbon dioxide capture line 90, an adsorbing solution supply line 100, an adsorbing solution collection line 110, an inert gas circulation line 120, an inner drain line 130, and an outer drain line 135. As indicated by the circled letters at the end of the respective lines, each of these lines is connected to the casing 2 of the first treatment tower 1A and the casing 2 of the second adsorption tower 1B. Each of the lines 40, 50, 60, 70, 80, 90, 100, and 110 includes a shared pipe and two branch pipes branching from one end of the shared pipe. Ends of the two respective branch pipes are connected to the two corresponding casings 2 by parallel connection.

The to-be-treated gas supply line 40 is a line for supplying the to-be-treated gas to the inner space of the casing 2. The other end (upstream end) of a shared pipe 41 is connected to the source of the to-be-treated gas (e.g., a boiler). One end (downstream end) of each of branch pipes 42A and 42B is connected to the gas inlet 10 (see FIG. 2). A condenser 36 and a heating device 37 are provided on the shared pipe 41. Valves 44A and 44B are provided on the branch pipes 42A and 42B, respectively.

The high-temperature fluid supply line 50 is a line for supplying the to-be-treated gas that serves as the high-temperature fluid to the fluid passage 20 (see FIG. 2) of the casing 2. The other end (upstream end) of a shared pipe 51 is connected to a portion of the shared pipe 41 of the to-be-treated gas supply line 40, the portion being upstream from the condenser 36 and the heating device 37. One end (downstream end) of each of branch pipes 52A and 52B is connected to the fluid inlet 17 (see FIG. 2). A valve 53 is provided on the shared pipe 51. Valves 54A and 54B are provided on the branch pipes 52A and 52B, respectively.

The high-temperature fluid discharge line 60 is a line for returning the to-be-treated gas that serves as the high-temperature fluid to the to-be-treated gas supply line 40. One end (upstream end) of each of branch pipes 62A and 62B is connected to the fluid outlet 18 (see FIG. 2). The other end (downstream end) of a shared pipe 61 is connected to a portion of the shared pipe 41 of the to-be-treated gas supply line 40, the portion being upstream from the condenser 36 and the heating device 37 but downstream from a position where the shared pipe 41 is connected to the high-temperature fluid supply line 50. A valve 63 is provided on the shared pipe 61. Valves 64A and 64B are provided on the branch pipes 62A and 62B, respectively. A valve 43 is provided on a portion of the shared pipe 41 of the to-be-treated gas supply line 40, the portion being downstream from the position where the shared pipe 41 is connected to the high-temperature fluid supply line 50 but upstream from a position where the shared pipe 41 is connected to the high-temperature fluid discharge line 60. As described below, valves 43, 53, and 63 function as a device for switching whether or not to supply the high-temperature fluid to the first treatment tower 1A or the second treatment tower 1B.

The clean gas discharge line 70 is a line for discharging the clean gas from the inner space of the casing 2. One end (upstream end) of each of branch pipes 72A and 72B is connected to the gas outlet 11 (see FIG. 2). The other end (downstream end) of a shared pipe 71 is connected to a chimney (not shown). Valves 73A and 73B are provided on the branch pipes 72A and 72B, respectively. A bag filter 74 and a fan 75 are provided on the shared pipe 71.

The water supply line 80 is a line for supplying liquid-phase water to the reservoir 31, the water being used for generating steam for use in desorbing carbon dioxide from the carbon dioxide adsorbing material 3. The other end (upstream end) of a shared pipe 81 is connected to a water supply source (not shown). One end (downstream end) of each of branch pipes 82A and 82B is connected to the water inlet 12 (see FIG. 2). Valves 83A and 83B are provided on the branch pipes 82A and 82B, respectively. A water supply pump 84 is provided on the shared pipe 81.

The carbon dioxide capture line 90 is a line for discharging carbon dioxide desorbed from the carbon dioxide adsorbing material 3 from the inner space of the casing 2 together with steam. One end (upstream end) of each of branch pipes 92A and 92B is connected to the carbon dioxide outlet 13 (see FIG. 2). The other end (downstream end) of a shared pipe 91 is connected to a capturing container (not shown). Valves 93A and 93B are provided on the branch pipes 92A and 92B, respectively. A vacuum pump 35 is provided on the shared pipe 91. The vacuum pump 35 is configured to decompress the inner space of the casing 2, thereby allowing the water stored in the reservoir 31 to evaporate at low temperatures. Thus, in the present embodiment, the vacuum pump 35 also forms a part of the aforementioned steam generator 30.

The adsorbing solution supply line 100 is a line for supplying the adsorbing solution to the shower 6. The other end (upstream end) of a shared pipe 101 is connected to an adsorbing solution tank 105 configured to store the adsorbing solution. One end (downstream end) of each of branch pipes 102A and 102B is connected to the adsorbing solution inlet 14 (see FIG. 2). Valves 103A and 103B are provided on the branch pipes 102A and 102B, respectively. An adsorbing solution supply pump 104 is provided on the shared pipe 101.

The adsorbing solution discharge line 110 is a line for returning the adsorbing solution to the adsorbing solution tank 105. One end (upstream end) of each of branch pipes 112A and 112B is connected to the adsorbing solution outlet 15 (see FIG. 2). The other end (downstream end) of a shared pipe 111 is connected to the adsorbing solution tank 105. Valves 113A and 113B are provided on the branch pipes 112A and 112B, respectively.

The inert gas circulation line 120 is a line for circulating the inert gas in such a manner as to cause the inert gas to flow through the inner space of the casing 2. The inert gas circulation line 120 includes a shared pipe 121, first branch pipes 122A and 122B, and second branch pipes 123A and 123B. The first branch pipes 122A and 122B branch off from one end of the shared pipe 121. The second branch pipes 123A and 123B branch off from the other end of the shared pipe 121. Ends of the respective first branch pipes 122A and 122B are connected to the gas outlet 11 (see FIG. 2) which is shared with the to-be-treated gas supply line 40. Ends of the respective second branch pipes 123A and 123B are connected to the gas inlet 10 (see FIG. 2) which is shared with the clean gas discharge line 70. Valves 124A and 124B are provided on the first branch pipes 122A and 122B, respectively. Valves 125A and 125B are provided on the second branch pipes 123A and 123B, respectively. The condenser 36, the heating device 37, and a fan 126 are provided on the shared pipe 121. The shared pipe 121 is connected to an inert gas supply line 127, which is a line for injecting the inert gas to the inert gas circulation line 120. A valve 128 is provided on the inert gas supply line 127.

The inner drain line 130 is connected to the inner drain port 16 (see FIG. 2). A valve 131 is provided on the inner drain line 130. The outer drain line 135 is connected to the outer drain port 19 (see FIG. 2). A valve 136 is provided on the outer drain line 135.

(Control System)

Returning to FIG. 2, the carbon dioxide separating and capturing apparatus includes a controller 140. The controller 140 is connected to a water temperature sensor 141, the heater 32, the agitator 33, and the vacuum pump 35. The water temperature sensor 141 detects the temperature of water stored in the reservoir 31. The controller 140 controls, in a manner described below, the operations of the heater 32, the agitator 33, and the vacuum pump 35 in accordance with the water temperature detected by the water temperature sensor 141. The controller 140 is also connected to the electric motor 26, the fans 75 and 126, and the above-described valves. The description below is given on the assumption that the controller 140 controls the operations of the electric motor 26, the heater 32, the agitator 33, the vacuum pump 35, the fans 75 and 126, and the valves.

(Carbon Dioxide Separating and Capturing Treatment)

Figure 3:
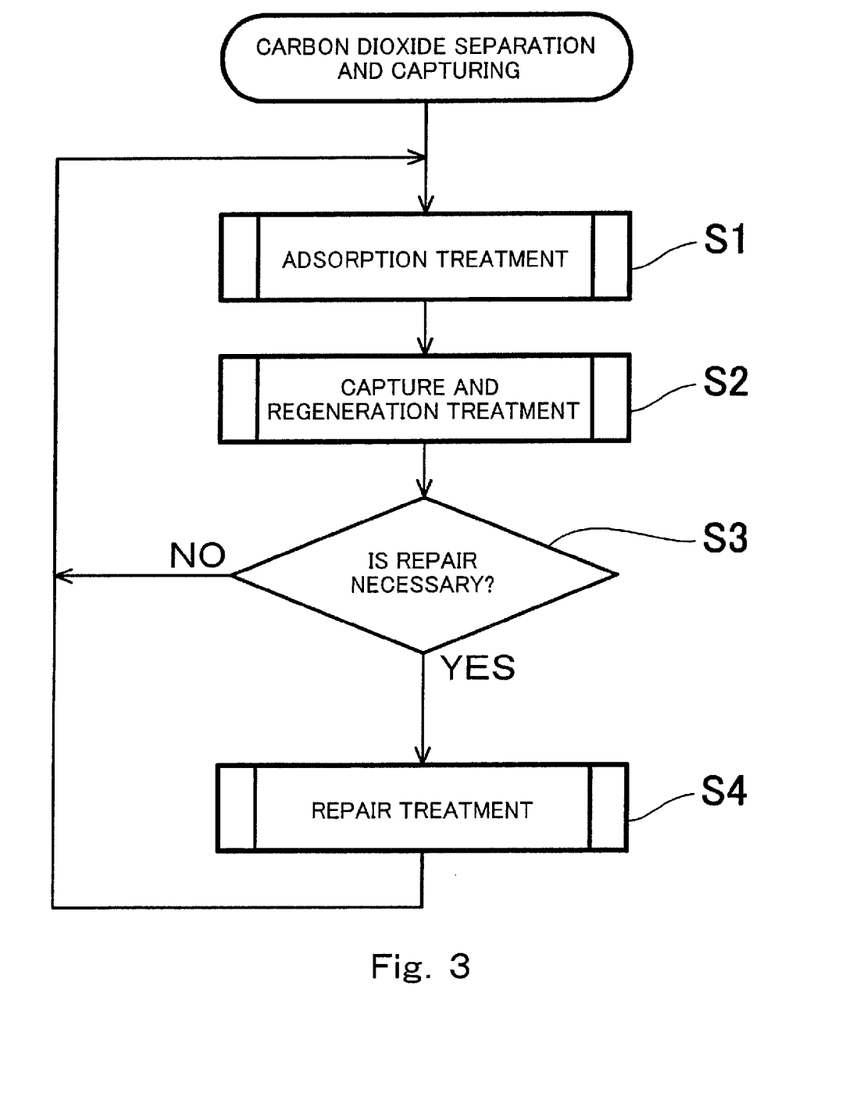
FIG. 3 is a flowchart showing steps of a carbon dioxide separating and capturing treatment performed by a controller shown in FIG. 2.
Figure 4:
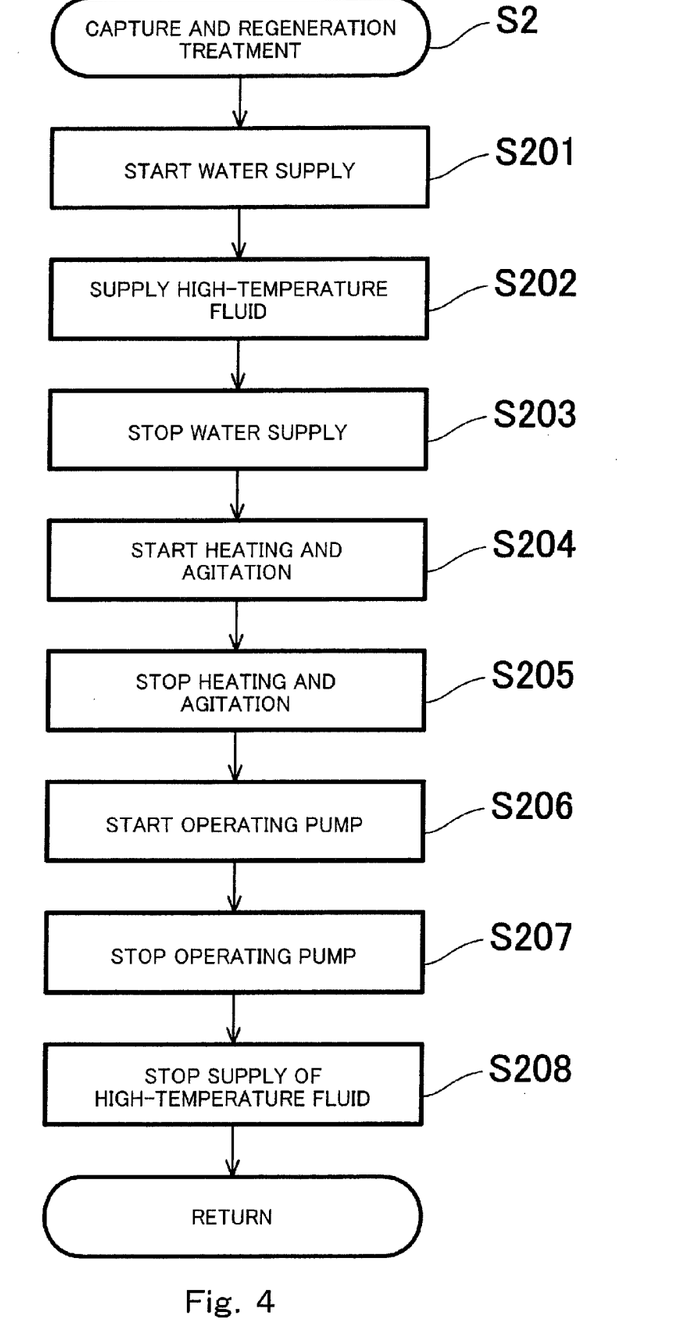
FIG. 4 is a flowchart showing steps of a capture and regeneration treatment shown in FIG. 3.
Figure 5:
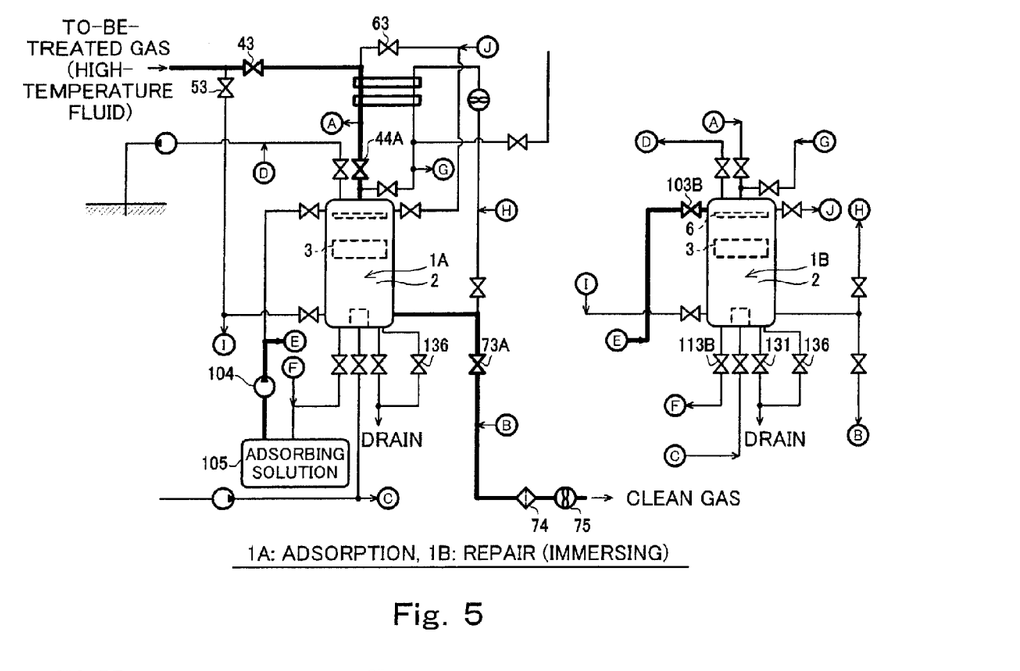
FIG. 5 is a functional diagram showing a flow of gas and the like when an adsorption treatment is performed in the first treatment tower and an immersing step of a repair treatment is performed in a second treatment tower.
Figure 6:
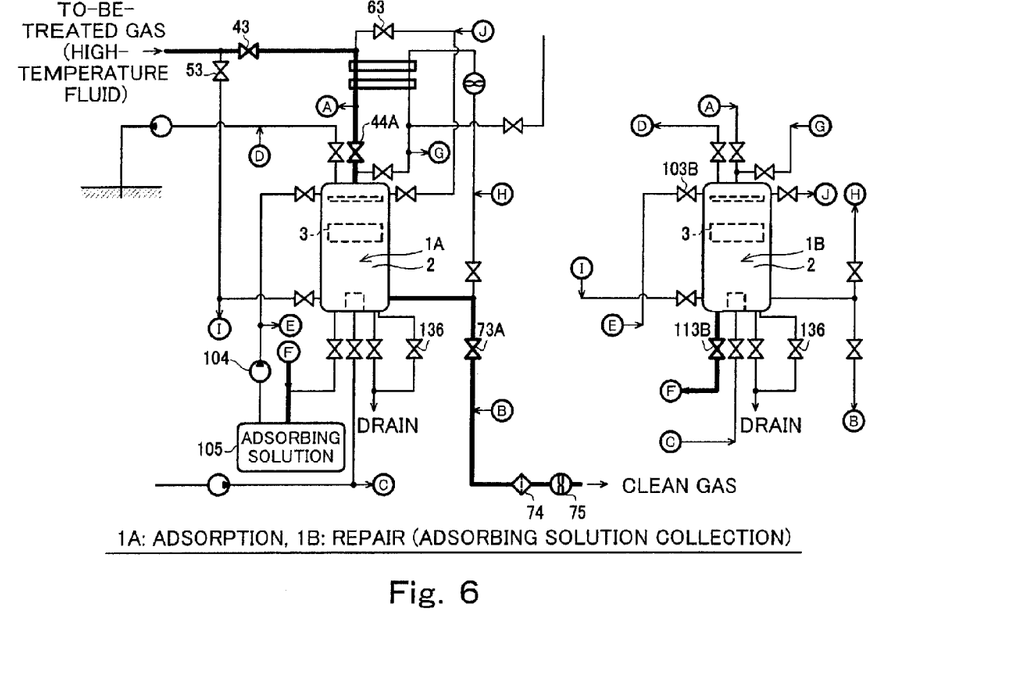
FIG. 6 is a functional diagram showing a flow of gas and the like when the adsorption treatment is performed in the first treatment tower and an adsorbing solution collecting step of the repair treatment is performed in the second treatment tower.
Figure 7:
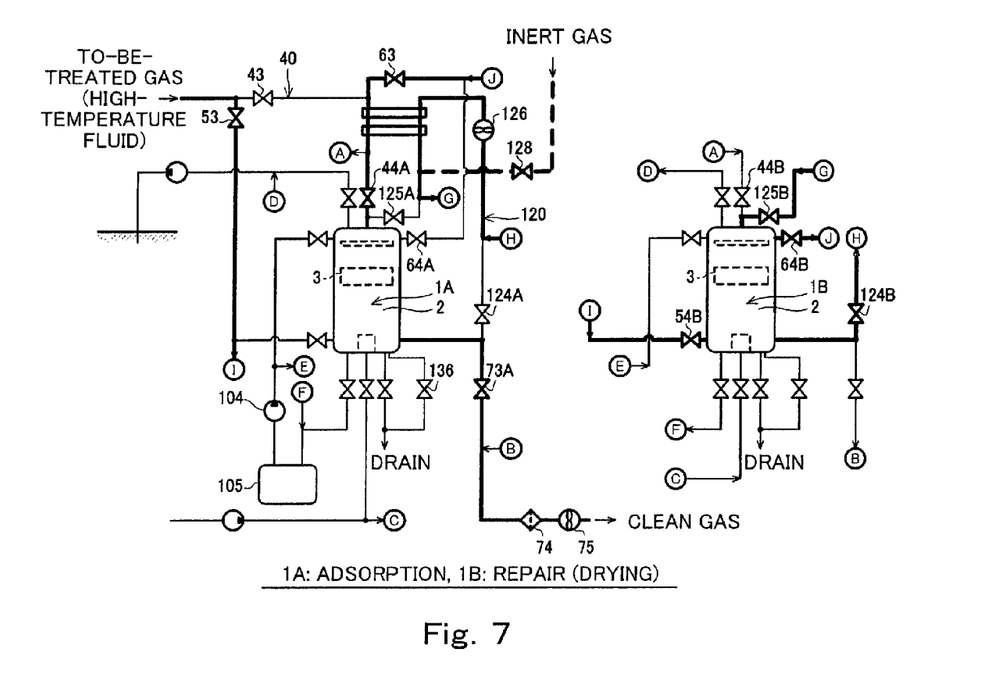
FIG. 7 is a functional diagram showing a flow of gas and the like when the adsorption treatment is performed in the first treatment tower and a drying step of the repair treatment is performed in the second treatment tower.
Figure 8:
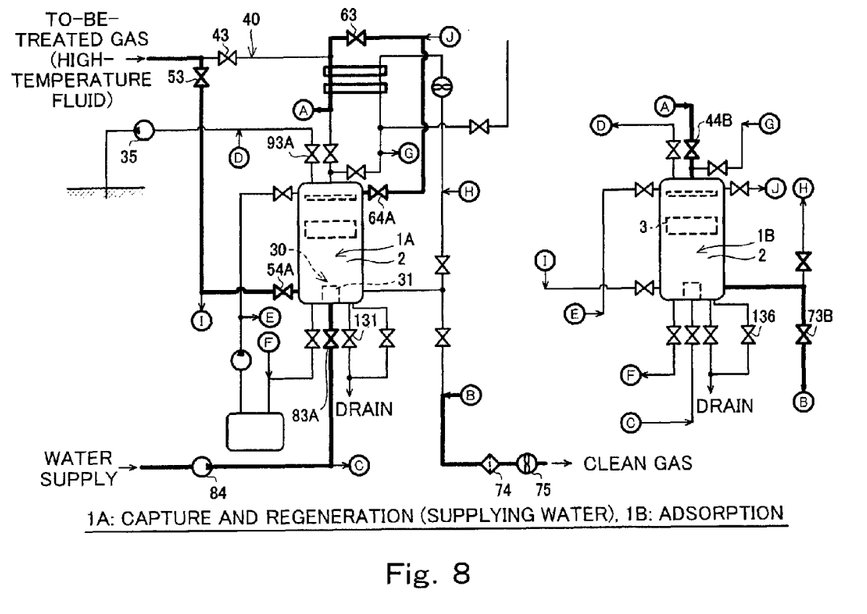
FIG. 8 is a functional diagram showing a flow of gas and the like when a water supplying step of the capture and regeneration treatment is performed in the first treatment tower and the adsorption treatment is performed in the second treatment tower.
Figure 9:
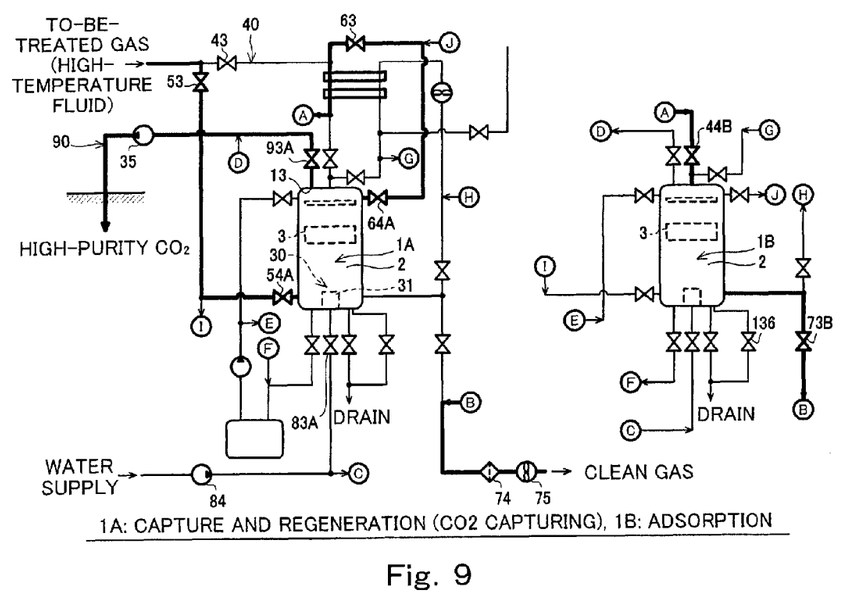
FIG. 9 is a functional diagram showing a flow of gas and the like when a carbon dioxide capturing step of the capture and regeneration treatment is performed in the first treatment tower and the adsorption treatment is performed in the second treatment tower.

FIG. 3 is a flowchart showing steps of a carbon dioxide separating and capturing treatment performed by the controller 140 shown in FIG. 2. FIG. 4 is a flowchart showing steps of the capture and regeneration treatment (S2) shown in FIG. 3. FIG. 5 is a functional diagram showing a flow of gas and the like when the adsorption treatment is performed in the first treatment tower 1A and the immersing step of the repair treatment is performed in the second treatment tower 1B. FIG. 6 is a functional diagram showing a flow of gas and the like when the adsorption treatment is performed in the first treatment tower 1A and the adsorbing solution collecting step of the repair treatment is performed in the second treatment tower 1B. FIG. 7 is a functional diagram showing a flow of gas and the like when the adsorption treatment is performed in the first treatment tower 1A and the drying step of the repair treatment is performed in the second treatment tower 1B. FIG. 8 is a functional diagram showing a flow of gas and the like when water supply for the capture and regeneration treatment is performed in the first treatment tower 1A and the adsorption treatment is performed in the second treatment tower 1B. FIG. 9 is a functional diagram showing a flow of gas and the like when carbon dioxide capturing of the capture and regeneration treatment is performed in the first treatment tower 1A and the adsorption treatment is performed in the second treatment tower 1B.

As shown in FIG. 3, in the treatment towers 1A and 1B, a series of adsorption treatment (step S1) and capture and regeneration treatment (step S2) is repeated. If the repair treatment becomes necessary for the reason that, for example, the number of times the series of treatments is repeated has reached a predetermined number or a time spent for the adsorption treatment has reached a predetermined period (S3: YES), then the repair treatment is performed to recover the adsorption capacity of the carbon dioxide adsorbing material 3 (step S4). In the present embodiment, while either one of the first and second treatment towers 1A and 1B is performing the regeneration treatment or the repair treatment, the other treatment tower performs the adsorption treatment (see FIG. 5 to FIG. 9). This makes it possible for the carbon dioxide separating and capturing apparatus to continuously perform the adsorption treatment without interruption.

(Adsorption Treatment)

Hereinafter, the adsorption treatment is described with reference to FIG. 5. In the description below, the first treatment tower 1A is assumed to be a treatment tower performing the adsorption treatment. When the adsorption treatment is performed in the first treatment tower 1A, among the valves provided for the first treatment tower 1A, the valves 44A and 73A are in an opened state and the other valves are in a closed state. However, the valve 136 may be either in an opened state or a closed state. If the valve 136 is open, a drain fluid accumulated in the fluid passage 20 can be discharged at the same time as the adsorption treatment is performed.

The opened or closed state of the valves 43, 53, and 63 varies depending on the treatment that is being performed in the second treatment tower 1B. If the adsorption treatment is being performed also in the second treatment tower 1B, then the valve 43 is in an opened state and the valves 53 and 63 are in a closed state since it is unnecessary to keep the casing 2 of the second treatment tower 1B warm. If the capture and regeneration treatment is being performed in the second treatment tower 1B, then the valve 43 is in an closed state and the valves 53 and 63 are in an opened state (see FIG. 8 and FIG. 9) since it is preferable to keep the casing 2 of the second treatment tower 1B warm. A case where the repair treatment is being performed will be described below.

Consequently, in the first treatment tower 1A, the to-be-treated gas flows into the inner space of the casing 2 and is fed to the carbon dioxide adsorbing material 3 in the housing case 4. Carbon dioxide contained in the to-be-treated gas is adsorbed by the adsorbent. As a result, the to-be-treated gas becomes a clean gas. The clean gas passes through the bottom wall of the housing case 4 (see FIG. 2), and is discharged from the inner space of the casing 2. The clean gas is discharged to the external air after being filtered by the bag filter 74. At the time, the fan 75 is in operation, which allows the to-be-treated gas and the clean gas to smoothly flow in the above-described manner. Since the other valves except for the valves 44A and 73A are in a closed state, the to-be-treated gas and the clean gas are prevented from flowing into the lines that are provided with these other valves.

(Repair Treatment)

Next, the repair treatment is described with reference to FIG. 5 to FIG. 7. In the description below, the second treatment tower 1B is assumed to be a treatment tower performing the repair treatment.

As shown in FIG. 5, when the immersing step of the repair treatment is performed, among the valves provided for the second treatment tower 1B, the valve 103B is in an opened state and the other valves are in a closed state. However, the valves 131 and 136 may be either in an opened state or a closed state. If the valves 131 and 136 are open, a drain fluid can be discharged at the same time as the repair treatment is performed. The movable plate 24 is in the closing position and the adsorbing solution supply pump 104 is driven. As a result, in the second treatment tower 1B, the adsorbing solution is supplied from the adsorbing solution tank 105 to the shower 6. Then, the adsorbing solution is jetted out downward from the shower 6, and is stored in the housing case 4 (see FIG. 2). When the adsorbing solution is stored up to a sufficient liquid level (height of the liquid surface) for immersing the carbon dioxide adsorbing material 3 in the adsorbing solution, the valve 103B is closed and the adsorbing solution supply pump 104 is stopped. Consequently, the supply of the adsorbing solution is stopped.

As shown in FIG. 6, when the adsorbing solution collecting step of the repair treatment is performed, among the valves provided for the second treatment tower 1B, the valve 113B is in an opened state and the other valves are in a closed state. However, the valve 136 may be either in an opened state or a closed state. The movable plate 24 is in the opening position. As a result, in the second treatment tower 1B, the adsorbing solution stored in the housing case 4 passes through the bottom wall of the housing case 4 (see FIG. 2). Then, the adsorbing solution is discharged from the inner space of the casing 2, and returned to the adsorbing solution tank 105.

As shown in FIG. 7, when the drying step of the repair treatment is performed, among the valves provided for the second treatment tower 1B, the valves 54B, 64B, 124B, and 125B are in an opened state and the other valves are in a closed state. Since the valves 54B and 64B are in an opened state, the valve 43 is in a closed state and the valves 53 and 63 are in an opened state. The movable plate 24 is in the opening position. It should be noted that, as indicated by a dotted line, immediately before the drying step is performed, the valves 128, 124B, and 125B are opened and the fan 126 is driven. As a result, the inert gas is injected into the inert gas circulation line 120. The valve 128 is closed when the injection of the inert gas into the inert gas circulation line 120 is ended.

After the injection of the inert gas into the inert gas circulation line 120 is ended, the inert gas flows into the inner space of the casing 2 in the second treatment tower 1B. Then, the inert gas passes through the bottom wall of the housing case 4, and is discharged from the inner space of the casing 2. The discharged inert gas flows along the inert gas circulation line 120, and is supplied to the inner space of the casing 2 again.

At the time, the fan 126 is in operation, which allows the inert gas to smoothly flow in the above-described manner. Since the other valves except for the valves 54B, 64B, 124B, and 125B are in a closed state, the inert gas can be prevented from flowing into the lines that are provided with these other valves.

As mentioned above, while the repair treatment is performed in either one of the first and second treatment towers 1A and 1B (in this example, the second treatment tower 1B), the adsorption treatment is performed in the other treatment tower (in this example, the first treatment tower 1A). When focusing attention on a relationship between the first and second treatment towers 1A and 1B, since the valve 44B provided for the second treatment tower 1B is in a closed state, the to-be-treated gas that is to be treated in the first treatment tower 1A can be prevented from entering the inner space of the casing 2 of the second treatment tower 1B. Moreover, since the valves 124A and 125A provided for the first treatment tower 1A are in a closed state, the inert gas that is to be supplied only to the second treatment tower 1B can be prevented from entering the inner space of the casing 2 of the first treatment tower 1A.

Meanwhile, in the second treatment tower 1B, the to-be-treated gas that serves as the high-temperature fluid is supplied to the fluid passage 20 (see FIG. 2). The high-temperature fluid (to-be-treated gas) discharged from the fluid passage 20 is returned to the to-be-treated gas supply line 40 and sent to the inner space of the casing 2 of the first treatment tower 1A. As a result, when the drying step is performed, the temperature of the casing 2 can be increased, and thereby the carbon dioxide adsorbing material 3 can be dried speedily. While the repair treatment is being performed in the second treatment tower 1B, the adsorption treatment is performed in the first treatment tower 1A. For this reason, the to-be-treated gas that serves as the high-temperature fluid can be prevented from being discharged to the external air without being subjected to the adsorption treatment. It should be noted that when the immersing step and the adsorbing solution collecting step are performed, the valve 43 is in an opened state and the valves 53 and 63 are in a closed state. As a result, the to-be-treated gas is not supplied to the fluid passage 20. This makes it possible to suitably suppress adsorbent vaporization.

(Capture and Regeneration treatment)

Next, the capture and regeneration treatment is described with reference to FIG. 4, FIG. 8, and FIG. 9. In the description below, the first treatment tower 1A is assumed to be a treatment tower performing the capture and regeneration treatment. Meanwhile, the second treatment tower 1B performs the adsorption treatment. Similar to the above description, when the adsorption treatment is performed in the second treatment tower 1B, among the valves provided for the second treatment tower 1B, the valves 44B and 73B are in an opened state and the other valves are in a closed state (see FIG. 8 and FIG. 9). However, the valve 136 may be either in an opened state or a closed state.

As shown in FIG. 4, in the capture and regeneration treatment, first, water supply to the reservoir 31 of the first treatment tower 1A is started (step S201), and the to-be-treated gas that serves as the high-temperature fluid is supplied to the fluid passage 20 of the first treatment tower 1A (step S202).

At the time, as shown in FIG. 8, among the valves provided for the first treatment tower 1A, the valves 54A, 64A, and 83A are in an opened state and the other valves are in a closed state. However, the valve 131 may be either in an opened state or a closed state. The valve 43 is in a closed state, and the valves 53 and 63 are in an opened state. Then, the water supply pump 84 is driven. As a result, in the first treatment tower 1A, liquid-phase water is stored in the reservoir 31, and also, the to-be-treated gas that serves as the high-temperature fluid is supplied to the fluid passage 20 (see FIG. 2). The high-temperature fluid (to-be-treated gas) discharged from the fluid passage 20 is returned to the to-be-treated gas supply line 40, and sent to the inner space of the casing 2 of the second treatment tower 1B. As a result, the to-be-treated gas that has served as the high-temperature fluid becomes a clean gas in the second treatment tower 1B. The clean gas is discharged to the external air.

Returning to FIG. 4, when the liquid level of the water supplied to the reservoir 31 has reached a predetermined level, the water supply to the reservoir 31 is stopped (step S203). At the time, the valve 83A is closed and the water supply pump 84 is stopped. Next, the water stored in the reservoir 31 is heated and agitated (step S204). At the time, the controller 140 causes the heater 32 and the agitator 33 to operate until the water temperature detected by the water temperature sensor 141 reaches a predetermined temperature (e.g., 60 degrees Celsius). When the water temperature has reached the predetermined temperature, the controller 140 stops the heater 32 and the agitator 33 from operating (step S205). Next, the vacuum pump 35 is operated (step S206).

At the time, as shown in FIG. 9, among the valves provided for the first treatment tower 1A, the valves 54A, 64A, and 93A are in an opened state and the other valves are in a closed state. The opened or closed state of each valve at the time is different from the opened or closed state of each valve while the heating and agitation of the water stored in the reservoir 31 are being performed, only in that the state of the valve 93A is switched from closed to opened. The opened or closed state of each of the other valves is maintained. It should be noted that while the water supply, heating, and agitation of the water stored in the reservoir 31 are being performed, the movable plate 24 may be either in the opening position or the closing position. However, the movable plate 24 is in the opening position at a point when the heating and agitation are ended.

Accordingly, in the first treatment tower 1A, the inner space of the casing 2 is decompressed owing to the operation of the vacuum pump 35. When the pressure in the inner space of the casing 2 has lowered to reach the saturated vapor pressure of the water stored in the reservoir 31, the water evaporates and the resultant steam is released in the inner space of the casing 2. Owing to the operation of the vacuum pump 35, the steam is drawn out of the inner space of the casing 2 into the carbon dioxide capture line 90 through the carbon dioxide outlet 13.

The carbon dioxide outlet 13 is provided at the top wall of the casing 2, whereas the reservoir 31 is set on the inner bottom of the casing 2. The carbon dioxide adsorbing material 3 is disposed at a vertically middle portion of the casing 2 so as to be positioned between the carbon dioxide outlet 13 and the reservoir 31. Accordingly, when the steam is drawn into the carbon dioxide capture line 90, the steam passes through the bottom and the inside of the housing case 4 and suitably comes into contact with the carbon dioxide adsorbing material 3. As a result, the carbon dioxide adsorbing material 3 is heated, and carbon dioxide adsorbed to the carbon dioxide adsorbing material 3 is desorbed. Owing to the operation of the vacuum pump 35, the desorbed carbon dioxide is drawn out of the inner space of the casing 2 into the carbon dioxide capture line 90 through the carbon dioxide outlet 13. In this manner, carbon dioxide can be desorbed and captured from the carbon dioxide adsorbing material 3, and the carbon dioxide adsorbing material 3 can be regenerated.

Returning to FIG. 4, when the desorption and capturing of carbon dioxide are completed, the vacuum pump 35 is stopped (step S207), and the supply of the high-temperature fluid to the fluid passage 20 of the casing 2 is stopped (step S208).

As described above, in the present embodiment, the reservoir 31, which stores water used for generating steam for use in the capture and regeneration treatment, is disposed in the inner space of the casing 2. That is, piping for supplying the steam from the outside to the inside of the casing is eliminated. As a result, heat loss from the steam and unevenness in the flow of the steam, both of which occur when the steam is supplied through piping, can be prevented. This makes it possible to reduce a necessary amount of steam for desorbing and capturing carbon dioxide (for carbon dioxide adsorbing material regeneration). In addition, the water temperature when the steam is generated can be lowered, which makes it possible to improve the efficiency of the carbon dioxide separating and capturing apparatus.

The reservoir 31 configured to store liquid-phase water from which the steam is generated is set within the casing 2, in particular, set on the inner bottom of the casing 2. The carbon dioxide adsorbing material 3 is disposed above the reservoir 31. This configuration makes it possible to readily arrange the structure for generating the steam in the inner space of the casing 2. Moreover, with such a configuration, the generated steam can be fed to the carbon dioxide adsorbing material 3 by utilizing natural convection.

The reservoir 31 is set at the center of the inner bottom of the casing 2. The area of the top opening of the reservoir 31 is larger than the cross-sectional area of general piping, for example, larger than the cross-sectional area of the passage of the water inlet 12. For this reason, unevenness does not easily occur in the flow of the steam discharged from the reservoir 31. This makes it possible to suppress uneven regeneration of the carbon dioxide adsorbing material 3 and reduce a necessary amount of steam for regenerating the entire carbon dioxide adsorbing material 3, thereby improving the efficiency of the carbon dioxide separating and capturing apparatus. Furthermore, the carbon dioxide outlet 13, through which carbon dioxide and steam are discharged from the inner space of the casing 2, is disposed at the center of the top wall of the casing 2. This makes it possible to further suppress the unevenness in the flow of the steam, thereby further improving the efficiency of the carbon dioxide separating and capturing apparatus.

As described above, at the time of generating steam in the inner space of the casing 2, the inner space of the casing 2 is decompressed. Accordingly, low-temperature steam can be generated. This makes it possible to suitably suppress degradation of the carbon dioxide adsorbing material 3 due to the heat of the steam, and reduce energy consumption and heating time of the heater 32.

In order to decompress the inner space of the casing 2, the vacuum pump 35 is provided on the carbon dioxide capture line 90, which is a line for capturing carbon dioxide desorbed from the carbon dioxide adsorbing material 3. The inner space of the casing 2 is decompressed by operating the vacuum pump 35. When the vacuum pump 35 stops, the internal pressure of the casing 2 is brought back to the pressure before the decompression. As a result, the generation of steam is stopped, and the drawing of carbon dioxide into the carbon dioxide capture line 90 is also stopped. That is, merely by switching between an operating state and a stopped state of the vacuum pump 35 and switching between an opened state and a closed state of the valve 93A, the followings can be switched at one time: whether or not to generate steam; whether or not to desorb and capture carbon dioxide (for carbon dioxide adsorbing material regeneration); and whether or not to draw carbon dioxide and steam from the inner space of the casing 2 into the carbon dioxide capture line 90 to capture the carbon dioxide. Therefore, compared to a case where piping for supplying steam to the inner space of the casing 2 is provided, the overall structure of the carbon dioxide separating and capturing apparatus can be made smaller in size, and also, the control for performing and stopping the capture and regeneration treatment can be simplified.

At the time of heating the carbon dioxide adsorbing material 3 with the steam, the temperature of the casing 2 is increased by the high-temperature fluid. This makes it possible to suppress heat loss from the steam, the heat loss occurring when the heat of the steam is taken away by the casing 2. For this reason, even if the temperature of the steam when the steam starts to be generated and the temperature of the steam while the steam is being generated are low, carbon dioxide can be desorbed from the carbon dioxide adsorbing material 3. This makes it possible to improve the efficiency of the carbon dioxide separating and capturing apparatus.

If it is required to increase the temperature of the casing 2, the temperature of the high-temperature fluid may be controlled to be higher than the temperature of the external air of the casing 2. In the present embodiment, since the temperature of the high-temperature fluid is higher than the temperature of the steam, heat loss from the steam can be suppressed favorably. Further, in the capture and regeneration treatment, prior to the generation of steam, water is supplied to and stored in the reservoir 31, and the stored water is heated and agitated. Here, substantially at the same time as the water supply to the reservoir 31 is started, the high-temperature fluid is supplied to the fluid passage 20 of the casing 2. Therefore, even if the casing 2 is large-sized and the thermal capacity of the casing 2 is great, when the steam is generated, the temperature of the casing 2 can be increased to substantially the same temperature as the temperature of the high-temperature fluid. This makes it possible to favorably suppress the heat loss from the steam and favorably improve the efficiency of the carbon dioxide separating and capturing apparatus.

In the carbon dioxide separating and capturing apparatus according to the present embodiment, the to-be-treated gas is a flue gas discharged from, for example, a boiler of a thermal power plant, and the temperature of the to-be-treated gas is originally higher than the temperature of the steam. Accordingly, the to-be-treated gas is applied as the high-temperature fluid for increasing the temperature of the casing 2. Therefore, a heating device or heat source dedicated for generating the high-temperature fluid is unnecessary. This makes it possible to favorably suppress an increase in the size of the overall structure of the carbon dioxide separating and capturing apparatus.

Although the embodiment of the present invention has been described above, the above configuration may be changed as necessary without departing from the scope of the present invention. For example, the carbon dioxide separating and capturing apparatus according to the above-described embodiment may be configured to produce the carbon dioxide adsorbing material. In order to produce the carbon dioxide adsorbing material, the housing case may be filled with the porous material, and the valves, the passage opening/closing mechanism, and the adsorbing solution supply pump may be operated in the same manner as that in the above-described repair treatment. However, the carbon dioxide separating and capturing apparatus according to the present invention is merely required to be capable of generating steam in the inner space of the casing 2. That is, the carbon dioxide separating and capturing apparatus need not be capable of performing the repair treatment and the carbon dioxide adsorbing material production. In such a case, the fixed plate with the through-holes formed therein is left in the passage opening/closing mechanism, and the other components of the passage opening/closing mechanism may be eliminated together with the shower. Although the to-be-treated gas is applied as the high-temperature fluid, a different gas or liquid may be applied as the high-temperature fluid.

Industrial Applicability

The present invention makes it possible to reduce a necessary amount of steam for desorbing and capturing carbon dioxide (for carbon dioxide adsorbing material regeneration) and reduce heat loss from the steam, thereby providing a functional advantage of being able to improve the efficiency of the carbon dioxide separating and capturing apparatus. The present invention is useful when applied to a carbon dioxide separating and capturing apparatus in which a solid-adsorbent method is applied for separating and capturing carbon dioxide.

REFERENCE SIGNS LIST 1A, 1B treatment tower
2 casing
3 carbon dioxide adsorbing material
10 gas inlet
11 gas outlet
12 water inlet
13 carbon dioxide outlet
17 fluid inlet
18 fluid outlet
20 fluid passage
21 inner shell
22 outer shell
30 steam generator
31 reservoir
32 heater
33 agitator
35 vacuum pump
40 to-be-treated gas supply line
50 high-temperature fluid supply line
60 high-temperature fluid discharge line
70 clean gas discharge line
80 water supply line
90 carbon dioxide capture line

The invention claimed is:
1. A carbon dioxide separating and capturing apparatus configured to separate carbon dioxide from a to-be-treated gas containing carbon dioxide and capture the carbon dioxide separated from the to-be-treated gas, the carbon dioxide separating and capturing apparatus comprising:
 a casing including inner space through which the to-be-treated gas flows;
 a carbon dioxide adsorbing material disposed in the inner space, the carbon dioxide adsorbing material adsorbing and separating carbon dioxide from the to-be-treated gas flowing through the inner space;
 a steam generator configured to generate steam in the inner space and release the steam in the inner space, the steam desorbing and capturing the carbon dioxide adsorbed to the carbon dioxide adsorbing material; and
 a carbon dioxide capture line, which is connected to a carbon dioxide outlet open to the inner space and through which the carbon dioxide desorbed from e carbon dioxide adsorbing material is discharged from inner space, wherein
 the steam generator includes:
  a reservoir set within the casing and configured to store water; and
  a decompressor provided on the carbon dioxide capture line, the decompressor being configured to (i) decompress the inner space through the carbon dioxide outlet, and (ii) draw steam that is generated by evaporating the water stored in the reservoir into the carbon dioxide capture line together with the carbon dioxide desorbed from the carbon dioxide adsorbing material.

2. The carbon dioxide separating and capturing apparatus according to claim 1, wherein
 the steam generator includes:
  a heater configured to heat the water stored in the reservoir; and
  an agitator configured to agitate the water stored in the reservoir.

3. The carbon dioxide separating and capturing apparatus according to claim 1, wherein the decompressor is a vacuum pump.

4. The carbon dioxide separating and capturing apparatus according to claim 3, wherein
 the carbon dioxide adsorbing material is disposed between the reservoir and the carbon dioxide outlet.

5. The carbon dioxide separating and capturing apparatus according to claim 1, wherein the reservoir is set at a center of an inner bottom of the casing.

6. The carbon dioxide separating and capturing apparatus according to claim 1, wherein
 the casing includes:
  an inner shell defining the inner space;
  an outer shell covering an outside of the inner shell;
  a fluid passage surrounded by the inner shell and the outer shell;
  a fluid inlet through which a high-temperature fluid flows into the fluid passage, the high-temperature fluid having a higher temperature than that of external air of the casing; and
  a fluid outlet through which the high-temperature fluid flows out of the fluid passage.

7. The carbon dioxide separating and capturing apparatus according to claim 6, further comprising:
 a to-be-treated gas supply line, through which the to-be-treated gas supplied to the inner space;
 a high-temperature fluid supply line, which branches off from the to-be-treated gas supply line and which is connected to the fluid inlet such that the to-be-treated gas flows into the fluid passage as the high-temperature fluid; and
 a high-temperature fluid discharge line, which connects the id outlet to the to-be-treated gas supply line such that the to-be-treated gas as the high-temperature fluid returns to the to-be-treated gas supply line.

8. The carbon dioxide separating and capturing apparatus according to claim 7, comprising a plurality of the casings which are at least two casings including a first casing and a second casing, wherein
 when the steam generator in the first casing is operated to desorb and capture carbon dioxide, the to-be-treated gas is supplied to the inner space of the second casing after being passed through the fluid passage of the first casing, and carbon dioxide is separated, by adsorption, from the to-be-treated gas in the second casing.

9. A method of separating and capturing carbon dioxide, the method comprising:
 an adsorption treatment of (i) supplying a to-be-treated gas containing carbon dioxide to an inner space of a casing, (ii) adsorbing and separating carbon dioxide from the to-be-treated gas by a carbon dioxide adsorbing material disposed in the inner space, and (iii) discharging a clean gas, from which carbon dioxide has been removed, from the inner space; and a regenerating and capturing treatment of releasing steam in the inner space to desorb carbon dioxide from the carbon dioxide adsorbing material to regenerate the carbon dioxide adsorbing material, and discharging the carbon dioxide desorbed from the carbon dioxide adsorbing material to a carbon dioxide capture line, which is connected to a carbon dioxide outlet open to the inner space, wherein the regenerating and capturing treatment includes:
  supplying water to a reservoir set within the casing; and
  operating a decompressor provided on the carbon dioxide capture line to decompress the inner space through the carbon dioxide outlet, evaporating water stored in the reservoir to generate steam in the inner space, and drawing the steam by the decompressor into the carbon dioxide capture line together with the carbon dioxide desorbed from the carbon dioxide adsorbing material.

\* \* \* \* \*